United States Patent [19]

McGrath et al.

[11] 4,054,759

[45] Oct. 18, 1977

[54] SUBSCRIBER LOOP VERIFICATION DEVICE AND METHOD

[75] Inventors: Ronald George McGrath; George Howard Wright, both of Dollard des Ormeaux, Canada

[73] Assignee: Northern Telecom Limited, Montreal, Canada

[21] Appl. No.: 741,899

[22] Filed: Nov. 15, 1976

[51] Int. Cl.² .............................................. H04B 3/46
[52] U.S. Cl. ........................................... 179/175.3 R
[58] Field of Search .............. 179/175.3 R, 175.31 R, 179/2A, 175; 340/172

[56] References Cited

U.S. PATENT DOCUMENTS

| 3,663,769 | 5/1972 | Boatwright et al. | 179/175.3 R |
| 3,725,613 | 4/1973 | Allen et al. | 179/175.3 R |
| 3,766,336 | 10/1973 | Wikholm | 179/175.3 R |
| 3,790,723 | 2/1974 | Stewart | 179/175.3 R |
| 3,867,588 | 2/1975 | Pickens et al. | 179/175.3 R |
| 3,912,882 | 10/1975 | Beerbaum | 179/175.3 R |

Primary Examiner—Douglas W. Olms
Attorney, Agent, or Firm—J. E. Moorhouse

[57] ABSTRACT

A subscriber loop test device is connected across a subscriber loop adjacent a subscriber equipment and remote an associated switching office. The subscriber loop test device includes a relaxation oscillator and a connection circuit responsive to a predetermined high voltage applied at the switching office for connecting the relaxation oscillator to the subscriber loop. The relaxation oscillator responds by drawing an energizing current which it modulates at the operating frequency of the oscillator. Detection of this frequency in the switching office verifies the DC and the AC continuity of the subscriber loop. Additional contacts in the connection circuit are used to disconnect the subscriber apparatus for the duration of the operation of the test device so that faulty subscriber apparatus will not interfere with verification of subscriber loop serviceability.

8 Claims, 3 Drawing Figures

SUBSCRIBER LOOP VERIFICATION DEVICE AND METHOD

The present invention relates to a circuit for the measurement of transmission quality of telephone subscriber loops to verify the serviceability of the loops, and more particularly to apparatus and method enabling said measurements to be performed at a location central to a plurality of said subscriber loops without involving participation by persons remote from the central location.

The maintenance of outside plant equipment has always been a significant cost to operating telephone companies. Various centrally located maintenance equipments have been developed for testing of subscriber loops. Typically these tests consist of a direct current or an alternating current test signal being placed across the subscriber loop and an analysis of the loading and/or reflection effects the loop imparts to the test signal. A DC signal can be used to test loop capacitance and insulation when the subscriber equipment is in an on-hook condition. In combination with known loop termination an AC signal is used to verify voice band serviceability of the loop.

Recently a trend has become apparent in that some subscriber equipment is now customer owned. Often, a malfunction in customer owned equipment results in a request for the operating company to check or repair the telephone line. In such circumstances field personnel are often required to journey to the far end of the subscriber loop to disconnect the subscriber equipment in order that the operating condition of the subscriber loop be verified without interference from the subscriber equipment. This has proven to be quite unnecessary and costly when it becomes apparent that the fault is in the subscriber owned equipment and not in the operating telephone company's transmission facility. Hence it is economically advantageous for an operating company to be able to verify loop serviceability without requiring the participation of field personnel.

The present invention provides a subscriber loop test device for the testing of subscriber loop serviceability at an associated switching facility using DC and AC signals simultaneously. The test device includes an oscillator means which causes cyclic variations in an energizing current being caused to flow therethrough. A connection means is connected between the oscillator means and a subscriber loop adjacent an associated subscriber equipment. The connection means is responsive to a predetermined voltage being maintained on the subscriber loop to connect the oscillator means across the loop and thereby cause AC modulation of the loop current. The magnitude and modulation characteristic of the loop current at the switching facility is an indication of the serviceability of the subscriber loop.

An additional feature includes contact means for isolating the subscriber equipment from the subscriber loop for the duration of a subscriber loop test. This carries an advantage in that the subscriber equipment is prevented from interfering with the test.

The present invention also provides a method of testing a subscriber loop circuit at an associated switching facility. The method includes the steps of providing a test device at the end of the loop circuit remote the switching facility, for drawing an energizing current and for generating a predetermined frequency signal in response to a predetermined voltage. The predetermined voltage is applied to the subscriber loop and loop serviceability is verified by detecting the predetermined frequency signal at the switching facility.

Example embodiments of the invention will now be described with reference to the accompanying drawings in which.

Figure 1:
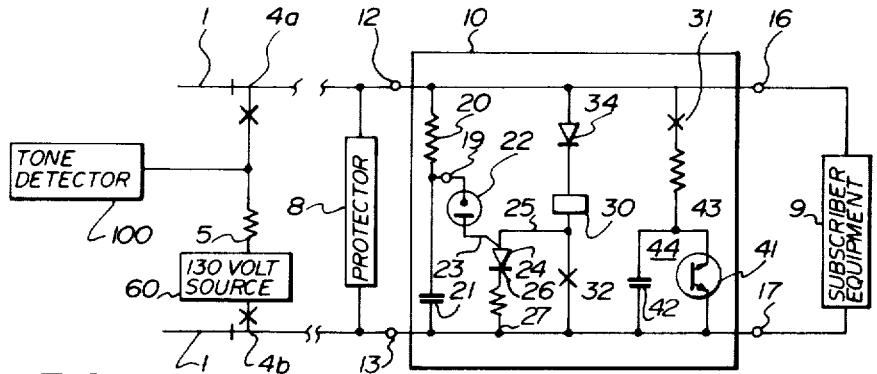
FIG. 1 is a block schematic diagram of a subscriber loop test device.

Each of the figures in the drawings includes some common or similar groups of circuit elements and hence for the purposes of this description similar circuit elements are identified by the same or similar reference labels. Each figure includes a test circuit which is connected to a subscriber loop via subscriber loop terminals 12 and 13, and is connected to a subscriber equipment via subscriber equipment terminals 16 and 17. The subscriber loop is normally connected to its associated switching facility (not shown). In the event that loop serviceability is to be determined, the subscriber loop is connected to circuitry, at the switching facility, for activating the test circuit and evaluating its response.

In FIG. 1, the circuit includes a tone detector 100, and a resistor 5 connected in series with a voltage source 60 between transfer contacts 4a and 4b. Leads of a subscriber loop 1 extend toward the subscriber's remote location, and a test circuit 10 is connected between the leads of the subscriber loop 1 and a subscriber equipment 9 via the subscriber loop terminals 12 and 13 and the subscriber equipment terminals 16 and 17. A protector element 8, for example a carbon block or a gas tube, is connected across the subscriber loop 1, as is standard practice, to protect the loop and the associated equipment from lightning damage and the like.

The test circuit 10 includes a charge storage means consisting of a capacitor 21 and a resister 20 connected in series across the subscriber loop terminals 12 and 13, the junction between the capacitor 21 and the resistor 20 being a discharge terminal 19. A diode 34, a relay 30 and a make contact 32 are connected in series between the terminals 12 and 13. A silicon controlled rectifier (SCR) 24 includes gate, anode and cathode electrodes 23, 25 and 26 and is connected in aiding current flow relationship to the junction between the relay 30 and the make contact 32. A resistor 27 is connected in series between the cathode electrode 26 and the subscriber loop terminal 13. A breakdown device, in this case a gas tube 22, is connected between the gate electrode 23 and the discharge terminal 19. A variable impedance 44, in this case a relaxation oscillator, includes a capacitor 42 connected in parallel with PNPN diode 41, sometimes referred to as a Diac$^{TM}$, connected in series with a resistor 43. The variable impedance is connected across the loop terminals 12 and 13 via a make contact 31.

In operation the high voltage source 60 is conveniently provided by the 130 volt DC source associated with the switching facility and typically used as a voltage source for the supervision of coin telephone service. To initiate a test the transfer contacts 4a and 4b are operated to apply +130 volts across the subscriber loop 1. In the switching circuit 10 the capacitor 21 slowly charges via the resistor 20. Eventually the breakdown potential of the gas tube 22 is reached and the gas tube 22 fires to discharge the capacitor 21 via the discharge terminal 19 through the gate electrode 23 and the resistor 27. This discharge causes the SCR 24 to turn ON in a well known manner which in turn causes current to flow in the relay 30 via the diode 34. The contacts 31 and 32 of the relay 30 are thus closed, locking the relay 30 in the operate condition and connecting the relaxation oscillator (41 – 43) across the subscriber loop via the contact 31. The impedance of the relaxation oscillator varies dynamically in a well known manner to induce cyclic fluctuations into the loop current. These cyclic fluctuations in the loop current are detected by the tone detector 100. Hence the DC and AC continuity of the subscriber loop 1 is substantially verified.

If the subscriber loop is unserviceable for example, when either one or both leads of the loop 1 are severed, or when the side of the loop to which the high voltage is applied is short circuited, or when the subscriber equipment is faulty loading the loop, the test circuit 10 fails to function. This is consequently evidenced by a lack of detection by the tone detector 100. Lack of detection will also occur when the AC shunt impedance of the loop is too low thus causing the voice continuity to be below a required minimum even though DC continuity may appear satisfactory. However, in this case the test device is activated and functioning but the impedance variations introduced by the test device are severely marked by the AC shunt impedance. As the +130 volt source is usually grounded on one side there is at least one condition in which the loop will appear to be functional when it is not. The high voltage source 60, in most switching offices, is usually grounded on one side. If a lead in the subscriber loop, which is connected to the ground side of the high voltage source 60, is also shorted to ground, this ground short will have no effect upon the test and hence will go undetected. However, this can be overcome by using an additional tone detector and a resistor, similar to the tone detector 100 and the resistor 5, connected to the other side of the subscriber loop. Serviceability of the subscriber loop is verified in this case by detection occuring simultaneously in both tone detectors.

Figure 2:
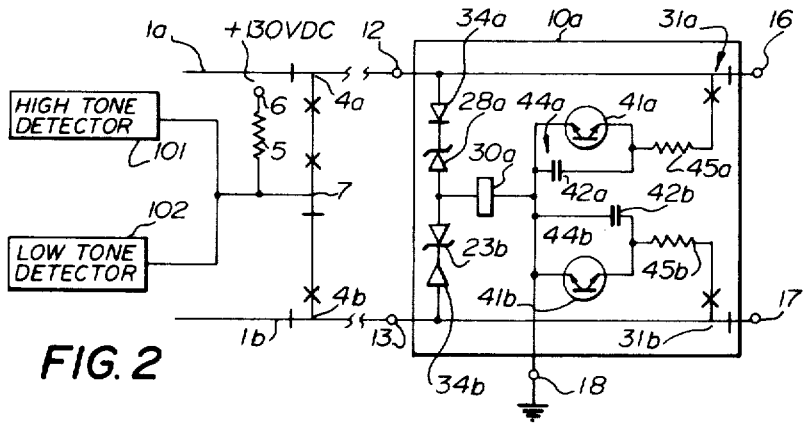
FIG. 2 is a block schematic diagram of a subscriber loop test device similar to the device shown in FIG. 1.

Referring to FIG. 2, a subscriber loop includes leads 1a and 1b which are each in series with break contact portions of transfer contacts 4a and 4b respectively. A + or positive 130 volt source or other convenient high voltage is connected to either of the transfer contacts 4a and 4b via a transfer contact 7 and a resistor 5. High and low tone detectors 101 and 102 have inputs connected to the junction between the resistor 5 and the transfer contact 7. A test circuit 10a is connected via subscriber loop terminals 12 and 13 to the leads 1a and 1b respectively. Subscriber equipment terminals 16 and 17 are for connection of subscriber equipment thereto as for example shown in FIG. 1. A ground terminal 18 is for connection with earth. The test circuit 10a includes two relaxation oscillators 44a and 44b. One relaxation oscillator 44a consists of a Diac 41a in parallel with a capacitor 42a, both connected in series with a resistor 45a, and the other relaxation oscillator 44b consisting of a Diac 41b in parallel with a capacitor 42b, both connected in series with a resistor 45b. The values of the capacitor 42a and 42b are different so that each oscillator will operate at a frequency different from the other. Diodes 34a and 34b are connected to the subscriber loop terminals 12 and 13 respectively and in series opposing relationship via Zener diodes 28a and 28b. The Zener diode 28a resides in series opposing relationship with the diode 34a and the Zener diode 28b resides in series opposing relationship with the diode 34b. A relay 30 is connected between a ground terminal 18 and the junction between the Zener diodes 28a and 28b. The relay 30 includes associated transfer contacts 31a and 31b. The break portion of the transfer contact 31a is connected in series between the terminals 12 and 16, and the break portion of the transfer contact 31b is connected in series between the terminals 13 and 17. The relaxation oscillator 44a is connected between the ground terminal 18 and the make portion of the transfer contact 31a, and the relaxation oscillator 44b is connected between the ground terminal 18 and the make portion of the transfer contact 31b.

In operation, to test the subscriber loop, the high voltage at terminal 6 is applied via the resistor 5 and the transfer contacts 7 to one of the transfer contacts 4a and 4b. The transfer contacts 4a and 4b are operated to isolate the leads 1a and 1b from the associated switching facility (not shown). Assuming the high voltage is applied via the break contact portion of the transfer contact 7, a current is drawn through the diode 34a, the Zener diode 28a, the relay 30 to ground via the terminal 18. The relay 30 responds by operating its associated contacts 31a and 31b. Hence the terminals 12 and 13 are disconnected from the terminals 16 and 17 respectively and interference from any associated subscriber equipment is thus prevented. The high voltage is applied via the make portion of the transfer contact 31a, across the relaxation oscillator 44a. The relaxation oscillator 44a operates in a well known manner to impart an AC modulation component onto the current flow in the lead 1a. This AC component is detected by one of the tone detectors 101 or 102, and the lead 1a is verified as serviceable. The high voltage is then withdrawn from the lead 1a and applied to the lead 1b by actuating the transfer contacts 7. The relay 30 is now operated via current flowing via the diode 34b and the Zener diode 28b. The high voltage is likewise withdrawn from the relaxation oscillator 44a and applied to the relaxation oscillator 44b via the make portion of the transfer contact 31b. Operation of the relaxation oscillator 44b causes detection in the other of the tone detectors 101 or 102, and the lead 1b is verified as serviceable.

Figure 3:
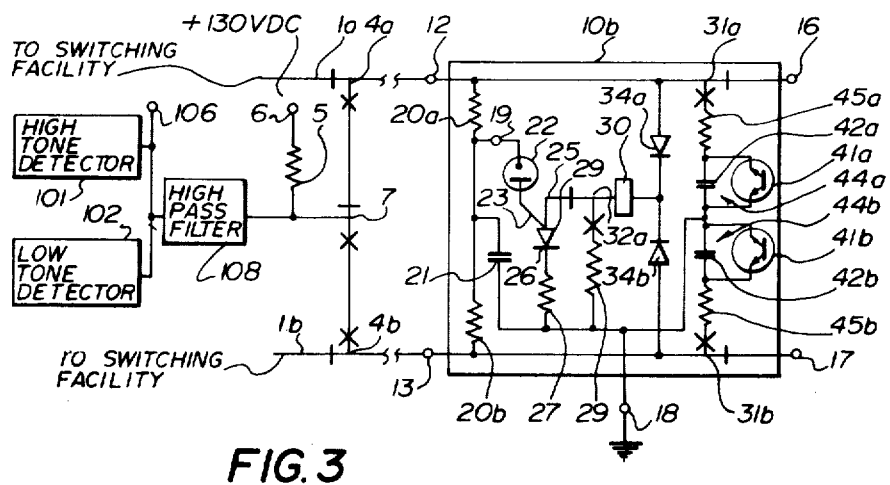
FIG. 3 is a block schematic diagram of a subscriber loop test device incorporating some of the features of the devices illustrated in FIGS. 1 and 2.

Referring to FIG. 3, a test circuit 10b is connected to the leads 1a and 1b of the subscriber loop in place of the test circuit 10a in FIG. 2. Also a high pass filter 108 is connected in series with the inputs of the high and low tone detectors 101 and 102 to facilitate measurement of AC signal levels at a terminal 106 without interference from DC potentials. All else, except for the details of the test circuit 10b, is essentially the same as illustrated in FIG. 2.

The test circuit 10, in FIG. 3, includes resistors 20a and 20b connected in series between subscriber loop terminals 12 and 13 and the junction between the resistors 20a and 20b is connected to a discharge terminal 19. Diodes 34a and 34b are connected in series opposing relationship between the subscriber loop terminals 12 and 13. A relay 30 includes associated transfer contacts 31a, 31b and 32a and is connected between the transfer contacts 32a and the junction between the diodes 34a and 34b. The make portion of the transfer contacts 32a is connected to a ground terminal 18 via a resistor 29. The break portion of the transfer contact 32a is connected to the anode electrode 25 of a silicon controlled rectifier (SCR) 24, the cathode electrode 26 being connected to the ground terminal 18 via a resistor 27. A charge storage means, a capacitor 21, is connected between the discharge terminal 19 and the ground terminal 18. A gas tube 22 is connected between the discharge terminal 19 and gate electrode 23 of the SCR 25. The transfer contacts 31a and 31b and relaxation oscillators 44a and 44b as described in FIG. 2 are connected similarly as shown and described in regard to FIG. 2.

The operation of the circuit of FIG. 3 in the area of the relaxation oscillator is similar to that described in conjunction with FIG. 2. The operation of the relay 30 and the associated circuitry is somewhat similar to that described in conjunction with FIG. 1 except that in this case the relay is operated by current supplied between one of the leads and the terminal 18 as in FIG. 2, rather than by outgoing and returning currents on both the loop leads, as in FIG. 1. In the arrangement illustrated in FIG. 3, test circuit 10b, has been found to provide more versatile performance that the test circuits 10 or 10a. The capacitor 21 is utilized purely as a store for trigger energy. The RC time constant of the capacitor 21 in combination with the resistors 20a and 20b is preferably quite long so that the capacitor 21 is not rapidly charged by typical high voltage transients which can occur from time to time on a subscriber loop. Hence a charge of sufficient potential to cause the gas tube to conduct is normally attained only in response to a plus 120 volt potential or greater at the terminal 6 being applied to the lead 1a or 1b for a substantial period of time for example about 3 seconds. When the gas tube fires to discharge the capacitor 21, the discharge current is conducted via the gate electrode 23 causing the SCR 24 to conduct. Current in the relay 30 flows initially via the SCR 24 and the break portion of the transfer contacts 32a. The make portion of the transfer contacts 32a is arranged to make connection before the break portion breaks connection and thus an alternate holding current path is established through the resistor 29 before the current path through the SCR 24 is broken. Once the contacts of the relay 30 are operated, operation of the test circuit 10b is identical to the apparatus of the test circuit 10a described in conjunction with FIG. 2.

Each of the foregoing test circuit arrangements described in conjunction with the FIGS. 1, 2 and 3 represents a significant departure from previous subscriber loop test apparatus and methods. Each of these circuits substantially verifies the subscriber loop serviceability by requiring DC continuity in order for the test circuit to be activated and at least a minimum AC transmission quality in order that loop serviceability be verified. In FIGS. 2 and 3 test circuits with the added versatility of disconnecting the subscriber equipment have been described. Only in the case where the subscriber equipment has introduced a permanent ground on both leads of the subscriber loop will the test circuits 10a or 10b fail to be operable on a serviceable loop.

In FIG. 1, the relaxation oscillator 44 operates in a balanced relation with the subscriber loop. In contrast in FIGS. 2 and 3, the relaxation oscillators 44a and 44b both operate in an unbalanced relationship with the subscriber loop. Hence the relaxation oscillators are preferably designed to induce a relatively low level of modulation into the energizing current to avoid any significant crosstalk problems with adjacent subscriber loops.

The circuits in FIGS. 1 and 3 are particularly advantageous in that they are virtually transparent to normal methods of subscriber loop testing. For example in one test with the well known type 14 Loop Test Desk a 100 volt signal is applied to the ring side of a loop through a 100 kilohm resistor and a 1.2 milliamp meter movement and then alternately applied to the tip side of the loop. Under these conditions the test circuits 10, 10a and 10b showed no appreciable leakage and thus had no appreciable effect upon this standard test. If there is a requirement for a subscriber loop test requiring higher voltages to be applied to the subscriber loop and at the same time it is desired that the test device remain inactive, this can be accommodated for example in FIG. 3 by replacing the gas tube 22 with another element having a higher threshold voltage.

What is claimed is:

1. A subscriber loop test device, for connection to a subscriber loop adjacent a subscriber equipment and remote a switching facility associated with the subscriber loop, the test device being operable in response to a predetermined DC signal from the switching facility, the test device comprising:
   oscillator means responsive to the predetermined DC signal for generating a predetermined inband AC signal to modulate the current in the subscriber loop;
   connection means for connecting the oscillator means to the subscriber loop in response to the predetermined DC signal,
   in the connection means, a relay having an operate coil connected across the subscriber loop, and a plurality of contacts, one contact connected in series with the coil and another contact connected in series with the oscillator means, and a relay operate circuit connected in parallel with said one contact and to the subscriber loop, the relay operate circuit being responsive to the predetermined DC signal to cause a current flow in the operate coil whereby said contacts are closed to electrically connect the operate coil across the subscriber loop and to electrically connect the oscillator means across the subscriber loop.

2. A test device as defined in claim 1 in which the relay operate circuit comprises:
   a charge accumulation circuit connected across the subscriber loop;
   a current switch connected in parallel with said one contact, the current switch including a control terminal and being responsive to a current pulse at the control terminal by becoming conductive;
   a threshold sensitive conductance device connected between the charge accumulation circuit and the control terminal, the conductance device responsive to a voltage of lower value than the voltage of the predetermined DC signal but greater in value than other voltages normally sustained on the subscriber loop to discharge the charge accumulation circuit through the control terminal to cause the current switch to conduct thereby operating the relay and latching the relay operated via the one contact until such time as the predetermined DC signal is withdrawn.

3. A test device as defined in claim 1, further comprising loop terminals for connection to the subscriber loop, subscriber terminals for connection to the subscriber equipment, and a ground terminal for connection to earth, and in which the oscillator means comprises two oscillator circuits each for connection between one of the loop terminals and the ground terminal, and in which the connection means comprises means for disconnecting the subscriber terminals in response to the predetermined DC signal.

4. A test device as defined in claim 3, in which the connection means further comprises one transfer contact means connected between one of the loop terminals, subscriber terminals and oscillator circuits, and another transfer contact means connected between the other of the loop terminals, subscriber terminals and oscillator circuits, whereby during connection of the oscillator means to the subscriber loop via said transfer contact means the subscriber equipment is disconnected, and during connection of the subscriber equipment to the loop via said transfer contact means the oscillator means is disconnected.

5. A test device as defined in claim 4 in which the connection means further comprises: a pair of diodes connected in series opposing relationship across the loop terminals; a relay having make and break contacts and an operate coil for operating said transfer contact means and said make and break contacts, the operate coil connected to the ground terminal via the make contact and to the junction between the pair of diodes, and a relay operating circuit comprising two resistances connected in series across the loop terminals, a capacitance connected between the ground terminal and the junction between the two resistors, the capacitor changing to a predetermined potential in response to the predetermined DC signal, and switch means responsive to the predetermined potential across the capacitor to operate the relay via the break contact, whereby the relay remains operated via the make contact until such time as the predetermined DC signal is removed.

6. A test device as defined in claim 4 in which each oscillator circuit operates at a frequency different than the oscillator circuit, whereby signals from the oscillator circuits are distinguishable one from the other at the switching facility.

7. A subscriber loop test system for verifying the serviceability of subscriber loops associated with a switching facility in a telephone system, the system comprising in combination:

a test device connected in series between the subscriber loop and a subscriber equipment associated with the subscriber loop; the test device including at least two oscillators having different operating frequencies for generating predetermined inband AC signals in response to a predetermined DC signal, to modulate current in the subscriber loop, and means for connecting the two oscillators each between one of said leads and earth in response to the predetermined DC signal;

a circuit, associated with the switching facility, for controlling and monitoring test devices, the circuit including two receivers each for detecting the operation of one of the oscillators, switch contacts for selectively connecting a source of said predetermined DC signal and the tone receivers between one and the other leads and earth, and a resistance means connected in series with said source, whereby in operation of the system detection by the appropriate receiver indicates that a selected lead in the subscriber loop being tested is in a serviceable condition.

8. A method of verifying the serviceability of a subscriber loop circuit at an associated switching facility, comprising the steps of:

a. providing a test device at the end of the subscriber loop circuit remote the switching office for drawing an energizing current and generating two distinct predetermined inband frequency signals, one signal in response to a predetermined DC signal being applied to one lead of the subscriber loop at the switching facility and the other signal in response to the predetermined DC signal being applied to the other lead of the subscriber loop at the switching facility;

b. applying said predetermined DC signal at the switching facility to one and then the other of the leads of the subscriber loop for a time longer than that required to cause the test device to operate;

c. at the switching facility, detecting one and then the other of said two distinct predetermined frequencies on one and then the other of said leads in the subscriber loop, whereby the serviceability of one and the other of the leads is verified independently one from the other.

* * * * *